United States Patent [19]

Yoshida et al.

[11] Patent Number: 4,700,336

[45] Date of Patent: Oct. 13, 1987

[54] OPTICAL RECORDING AND PLAYBACK APPARATUS USING PLURAL LIGHT SPOTS

[75] Inventors: Tomio Yoshida, Katano; Yoshinobu Nakata, Ikoma; Shunji Ohara, Higashiosaka; Toshio Satoh, Hirakata, all of Japan

[73] Assignee: Matsushita Electric Industrial Co., Ltd., Kadoma, Japan

[21] Appl. No.: 745,637

[22] Filed: Jun. 17, 1985

[30] Foreign Application Priority Data

Jun. 19, 1984 [JP] Japan .................................. 59-125906
Jun. 19, 1984 [JP] Japan .................................. 59-125907

[51] Int. Cl.$^4$ ............................................. G11B 7/095
[52] U.S. Cl. ........................................ 369/44; 369/46; 369/110; 250/202
[58] Field of Search ................ 369/44, 46, 110, 111, 369/121, 122; 250/202

[56] References Cited

U.S. PATENT DOCUMENTS

| | | | |
|---|---|---|---|
| 3,969,575 | 7/1976 | Gerritsen | 369/46 |
| 4,486,791 | 12/1984 | Wada | 369/44 |
| 4,564,931 | 1/1986 | Ohara | 369/122 |
| 4,566,088 | 1/1986 | Yoshida | 369/122 |
| 4,571,712 | 2/1986 | Romano | 369/46 |

FOREIGN PATENT DOCUMENTS 197935 10/1985 Japan ..................................... 369/44

*Primary Examiner*—Alan Faber
*Attorney, Agent, or Firm*—Cushman, Darby & Cushman

[57] ABSTRACT

In an optical recording and playback disc apparatus, two light beams (l, m) are focused by a common focusing lens (108) onto an information track (51) of the optical recording disc, and the focused light means (l, m) form two light spots (L, M), the position thereof being controlled by a first tracking servo loop (115, 116 and 117), and furthermore, one (M) of the light spots is independently controlled from the other light spot (L) by a second tracking servo loop (120, 121 and 122).

21 Claims, 7 Drawing Figures

OPTICAL RECORDING AND PLAYBACK APPARATUS USING PLURAL LIGHT SPOTS

BACKGROUND OF THE INVENTION

1. Field of the Invention

The present invention relates to an optical recording and playback apparatus.

Furthermore, the detailed construction of the invention is such that the light beams from the plural laser light sources are focused in a range of small diameter of several μm by a lens or the like, and then applied to an optical recording medium in order to record and play back the signal in high density.

2. Description of the Prior Art

In an example of an optical recording and playback apparatus in the prior art, a microscopic laser beam spot is applied to a rotating optical recording disc. The signals in this apparatus are recorded on the optical recording disc with high recording density using energy of the laser beam such that the intensity is modulated by the recording signal.

On the other hand, in order to play back the recorded signal, a laser light with constant intensity is applied to the position of the recorded signal on the optical recording disc, and the recorded signal is played back by the detection of reflected light or transmitted light from the optical recording disc. In that this optical recording and playback apparatus can record with the high density, memory cost per bit is cheap, high speed access is possible, and the optical head is operated on a non-contact basis with the optical recording disc. Furtheremore, in such apparatus, recording and playback are stable and therefore such systems are attracting much attention as a new media for memory storage in an information oriented society.

In an optical recording and playback apparatus in the prior art, two light spots are applied to adjacent positions on the same information track of the disc. In this apparatus, one light spot records the signal in the information track and at the same time the other light spot plays back the just recorded signal to ascertain whether or not the signal is recorded correctly. Furthermore, in Japanese Patent Application No. Sho 59-52607, an apparatus is proposed which has two light spots which are different in shape and are applied to adjacent positions on the same information track. In this apparatus, one light spot erases the previously recorded signal and at the same time another light spot records the new information signal. In this conventional apparatus, two light beams are focused to small spots by the same focusing lens. For example, the first light beam, which is used for recording and playback, is applied to an appointed information track by means of a known tracking control technique. The position of the second light spot is maintained by the mechanical positioning accuracy of the optical system. The second light spot is applied on the same information track as the first light spot with accuracy of position, for example, of ±0.2 μm. According to these conventional methods, it is apprehended that the position of the second light spot may move from the appointed information track on account of the slip of the position of the light source for the second light spot or the position of the optical elements passing the second light beam. Especially, these apparatuses are unsteady against a secular change, a temperature change or a shock from the outside of the apparatus. Furthermore, there is a problem as to the shift of the optical head in the radial direction of disc. The well known swing arm configuration is difficult to adopt in an optical recording disc. As to a straight shift configuration, since the above-mentioned accuracy of the light spot position is required both for the inner or outer information track of the optical recording disc, the shift mechanism itself of the optical head for the optical recording disc must be highly precise.

SUMMARY OF THE INVENTION

The object of the present invention is to provide an optical recording and playback apparatus using plural light spots which run on the same information track of the optical recording medium with high accuracy and stability, by means of a first tracking servo loop using one light beam and another tracking servo loop using the other light beam.

An optical recording and playback apparatus in accordance with the present invention has plural light spots comprises: a first detecting means for detecting a tracking error signal of a first light spot, a second detecting means for detecting a tracking error signal of a second light spot, a common focusing means for forming the first and second light spots on an information track of an optical recording medium, a first driving means for driving the first and second light spots in a linked relation in a substantially perpendicular direction to a specified information track, a first tracking servo loop for controlling the first driving means based on an output of the first detecting means, a second driving means for driving the second light spot in a substantially perpendicular direction to a specified information track, and a second tracking servo loop for controlling the second driving means based on an output of the second detecting means.

DESCRIPTION OF THE PREFERRED EMBODIMENT

Figure 1:
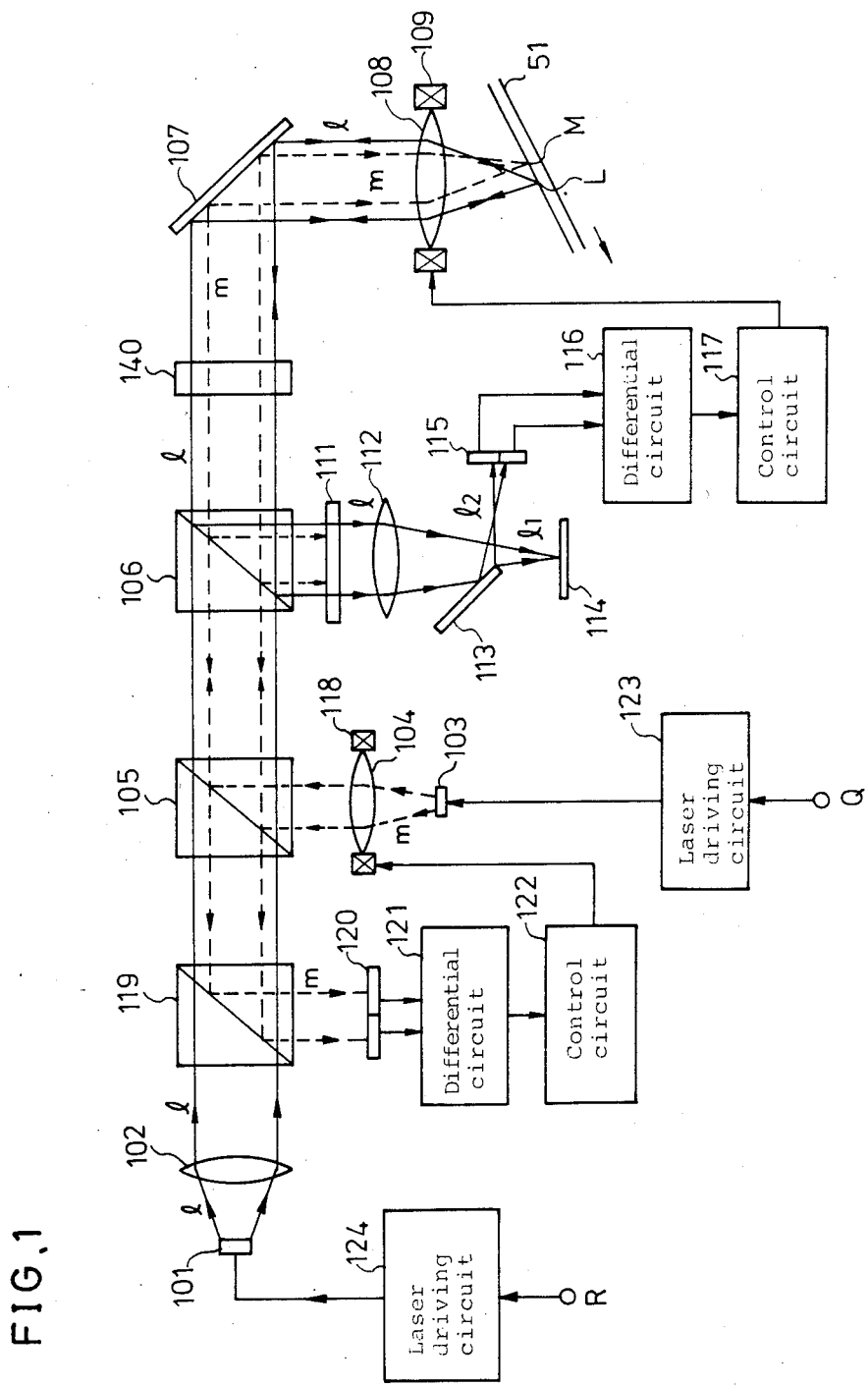
FIG. 1 is a block diagram of apparatus embodying the present invention.

FIG. 1 is a block diagram of an embodiment of an optical recording and playback apparatus in accordance with the present invention. In FIG. 1, first semiconductor laser 101 for recording and playback radiates a light beam l; with wavelength λ1. A collimator lens 102 collimates the light beam l from the semiconductor laser 101 to a roughly parallel light beam.

A light beam splitter 105 transmits the light with wavelength λ1, and reflects the light with wavelength λ2 which is mentioned later on. A beam splitter 106 and a reflecting mirror 107 are disposed in the path of the light beam l. The light beam l from the semiconductor laser 101 passes through these optical elements and is applied to a focusing lens 108. The light beam l is focused by the focusing lens 108 to a nearly circular light spot L and is applied on an information track 51 of the optical recording disc. A well known driving means 109 for driving the focusing lens 108 drives the focusing lens 108 in a direction of an optical axis of beam 1 responding to the change of distance between the information track 51 of the optical recording disc and the focusing lens 108 which is caused by a surface deflection of the optical recording disc, etc.; and thus automatically controls the focus of the light spot L. This driving means 109 also drives the focusing lens 108 in a radial direction for a well known tracking control.

Figure 2:
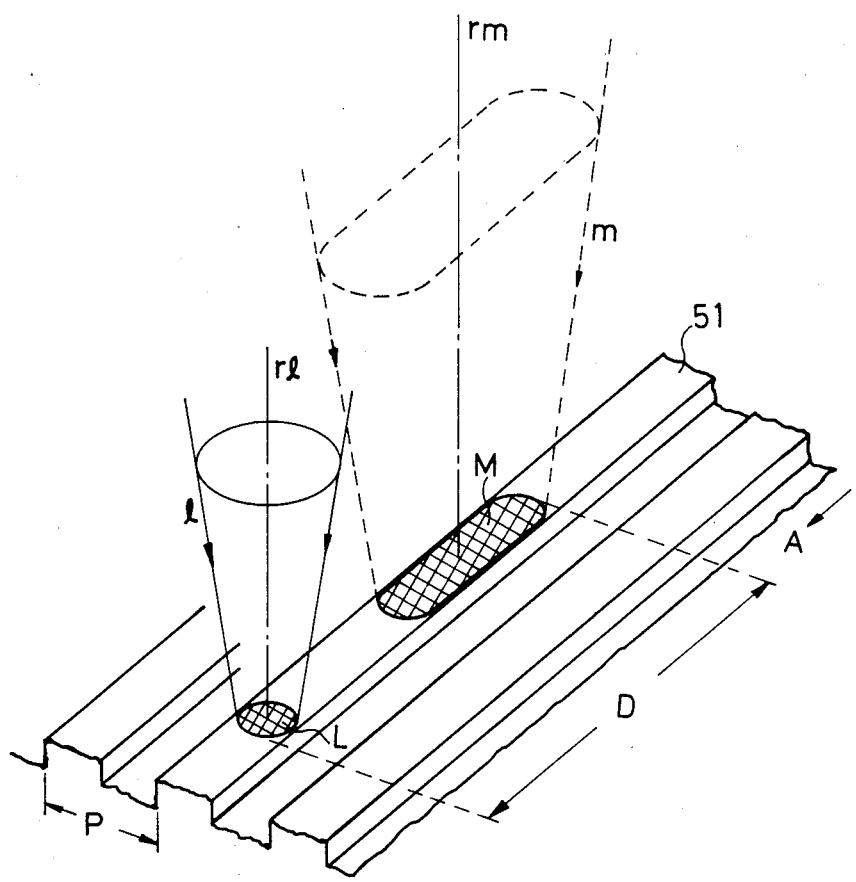
FIG. 2 is a perspective view showing the light spots which are applied on an information track of the optical recording disc.

In FIG. 1, a second semiconductor laser 103 radiates a light beam m with a wavelength λ2. A collimator lens 104 collimates the light beam m to a roughly parallel light beam that has a cross-sectional oval shape. A part of this light beam m is reflected by the beam splitter 105, and goes through almost the same light path of the light beam 1, and is focused by the focusing lens 108. The light spot M which is made by focusing the light beam m by focusing lens 108 is oval in the cross-section and is applied to the same information track 51 of the light spot L, positioning the major axis of the oval light spot M in a direction parallel to the running direction of the information track as shown in FIG. 2. In FIG. 1, the light beam 1 reflected by the information track 51 of the optical recording disc is transmitted through the focusing lens 108 and is reflected by mirror 107, and the direction of the light beam 1 is changed by beam splitter 106 and is applied to a filter plate 111. In this filter plate 111, the light beam with wavelength λ1 only is transmitted and the light beam m with wavelength λ2 does not pass. A single lens 112 converges the reflected light beam 1. A reflecting mirror 113 reflects about half of the light beam 1 to a light detector 115. This part of the light beam is shown as 12. A known focusing detector 114 consisting of a photodiode 114 having two individual sensing parts is arranged at the focusing position of the single lens 112. The photodiode 114 produces a focusing error signal corresponding to the moving of the focusing position of a light beam 11 which is the remainder of the light beam reflected by the mirror 113. The photodiode 115 also has two sensing parts and produces the well known tracking error signal from the reflected light beam 12. A well known quarter wave plate 140 is arranged between the beam splitter and mirror 107 in order to efficiently transmit the reflected light beam from the optical recording disc to the photodiode 114 and 115. A polarizing beam splitter is used as a beam splitter 106.

The recorded signal in the information track 51 of the optical recording disc is played back by the photodiode 114 and 115. In order to detect the tracking error signal, the two sensing parts of two output signals of the photodiode 115 are applied to two input terminals of a differential circuit 116 respectively. A differential signal between two detected signals from the two sensing parts of the photodiode 115 issued from the differential circuit 116 is applied to a control circuit 117. The phase of the differential signal is compensated by the control circuit 117. The differential signal from the control circuit 117 is applied to driving means 109, and drives lens 108. The focusing lens 108 is moved in a plane substantially parallel to the plane of the disc 1 in a direction perpendicular to the information track 51. The light spot L is controlled by moving the focusing lens 108 so as to trace the information track. As is the light spot L, so the light spot M is driven to be applied on the information track 51. The tracking control loop comprising the reflected light beam 1, the photodiode 115, the differential circuit 116, the control circuit 115 and the actuator 109 constitutes a first tracking servo loop.

On the other hand, the reflected light from the light spot M passes through the focusing lens 108 and is reflected by the mirror 107, and further passes through the beam splitter 106 and the beam splitter 105, and is changed in the direction by the beam splitter 119, and is applied to a photodiode 120 having two sensing parts. Two output signals of the photodiode 120 are applied to the two input terminals of a differential circuit 121, and a differential signal between two detected signals of the two sensing parts of the photodiode 120 is issued and is applied to a control circuit 122. The differential signal is subjected to a phase-compensation for stable servo-control and then is applied to a second driving means 118, and thereby drives the collimator lens 104 in a direction perpendicular to the optical axis. As a result, the light spot M is controlled independently from the light spot L, and traces the information track 51. The tracking control loop comprising the reflected light beam M, the photodiode 120, the differential circuit 116, the control circuit 122 and the driving means 118 constitutes a second tracking servo loop. A laser driving circuit 123 drives the semiconductor laser 103. The intensity of the oval light spot M which is applied on the information track 51 is controlled by the signal which is applied to an input terminal Q.

Figure 3:
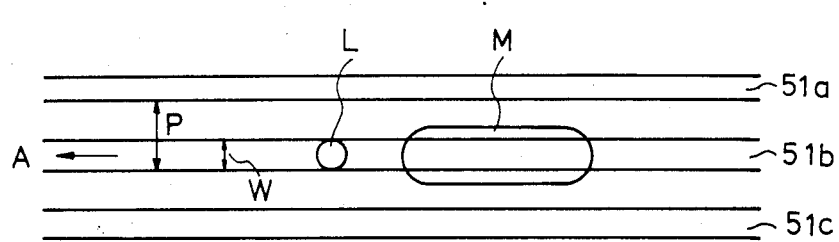
FIG. 3, FIG. 4(a) and FIG. 4(b) are plan views showing the positions of the light spots against the information track.

In FIG. 2, the arrangement of the light spots L and M on the information track 51 of the optical recording disc is shown magnified. The above-mentioned information track 51 is defined by a fine groove or the like used for an optical guide. An arrow A shows a relative moving direction of the information track 51 to the light spots L and M. The optical axis of the light beam m with the wavelength λ2 is shown by a chain line rm. The light spot M which is formed on the information track 51 has an oval cross-section as shown in FIG. 2, and is used for erasing. Furthermore, the optical axis of the light beam 1 with the wavelength λ1 is shown by a chain line rl. The light spot L is formed on the information track 51, and is used for recording and playback. The pitch of the information tracks is shown as P. FIG. 3 shows a plan view showing the position of the two light spots L and M on the information track 51b, and shows also two adjacent information tracks 51a and 51c. The light spot L is controlled by the above-mentioned first tracking servo loop, and is applied on the information track 51b.

On the other hand, the light spot M has a positioning error according to the positioning accuracy of the semiconductor laser 103 and other optical elements, and is applied on the information track 51b including the above positioning error.

The position of the light spot M is controlled by a first tracking servo loop, and it has the constant error, the light spot M is applied along the information track 51.

Width W of the information track 51 in the optical recording disc is, for example, 0.7 μm, pitch P of tracks is typically 1.6 μm. Therefore, it is preferable that the light spot M scan the information track 51 with an accuracy of 0.1–0.2 μm. In order to maintain the abovementioned accuracy, in the relative position between the semiconductor laser 103 and collimator lens 104 of the FIG. 1, a strick mechanical accuracy is required. Furthermore, the above-mentioned mechanical accuracy is required to be stable in a temperature change. Therefore, in order to control the relative position, the abovementioned defect is compensated by the tracking servo loop as shown in FIG. 1 and FIG. 2. Thus, utility of the optical recording and playback apparatus is high.

Figure 4:
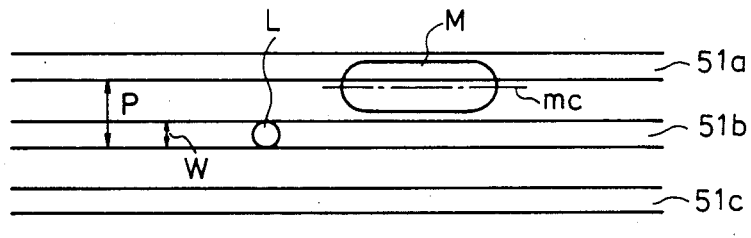
Figure 4:
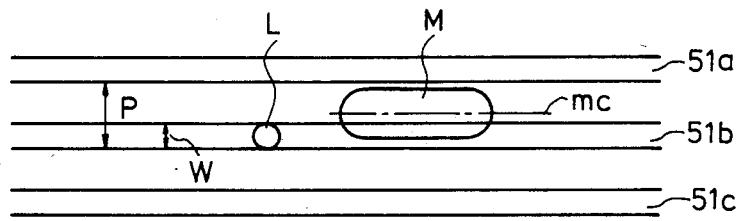

The second tracking servo loop in accordance with the present invention is elucidated as follows. In the case that two tracking servo loops are provided as shown in FIG. 3, it is important that the light spots L and M must be on the same information track. If the first tracking servo loop would be in operation and the second tracking servo loop would be out of operation. In FIG. 4, the relative position between both light spot L and M and the information track 51, the light spot L can trace the information track 51 with an error of ±0.1 μm by well known methods, when the position of information track 51 changes within ±100 μm. The light spot M follows the light spot L with the constant error which is determined by the mechanical accuracy.

In FIG. 4, a center line mc shows the center of the light spot M along the information track 51. As shown in FIG. 4(a), the center line mc of the light spot M is apart from the center of the information track 51 by over $$\frac{W}{2} + \frac{1}{2}(P - W) = \frac{P}{2}.$$

This distance corresponds to the error corresponding to the above mechanical accuracy. When the second tracking servo loop is operated, the light spot M is pulled in the information track 51a, and not applied on the information track 51b. As a result, the light spots L and M undesirably trace different information tracks 51b and 51a, respectively. In order to prevent the above-mentioned trouble and to make both beams trace on the same information track, the light spot M is required to be arranged within the mechanical accuracy of ±P/2 (P: track pitch) to the position of the light spot L in the radial direction of a disc. When the pitch P is 1.6 μm, the predetermined mechanical accuracy of within ±0.8 μm is required. This value has a margin of 4-8 times against the scanning accuracy which is shown in FIG. 4. In FIG. 4(b), the center line mc of the light spot M is within the distance P/2 to the center of the information track 51b. In this condition, when the second tracking servo loop is operated, both the light spot L and M scan the information track 51b. The first tracking servo loop sufficiently conpensates the error of the position of the light spot L and M in accordance with the eccentricity of the information track. Since the second tracking servo loop compensates a slight error between the light spot L and the light spot M, the gain of the second tracking servo loop may be very low. The range of the control or the range of the driving length two times of the track pitch P is sufficient even when the broadest range is considered.

On the other hand, since the second tracking servo loop compensates the constant error between the light spot M and the information track 51, the frequency range of the servo loop can be narrower than that of the first tracking control loop.

In the actual operation of the above two tracking servo loops is, it is preferable that at first the first tracking servo loop starts operation, and after the light spots L and M began to trace the target information track, the second tracking servo loop is operated. If the operation of the two tracking servo loops is operated in reverse order, after the light spot M catches the information track 51a, the light spot L catches the information track 51b. As a result, it is feared that both light spots may trace different information tracks. For instance, in case the light spot accesses the information track of an appointed address at a high speed, it is effective if the appointed address is first searched by the first tracking servo loop, and after reading the appointed address, the second tracking servo loop is started.

As has been described in FIG. 1, in the example of the light beam driving means of the tracking servo loop, a focusing lens 104 is driven in the substantially perpendicular direction to the light axis at the collimator lens 104, and also driven in such a manner that the light spot moves perpendicular to the information track on the optical recording disc. That is, the position of the light spot M controlled by the focusing lens 108 is moved by means of the change of the angle of the light axis at the part of the focusing lens 108 of the substantially parallel light beam m, responding to the moving of the light at the collimator lens 104. As mentioned above, the moving range of the light spot M can be very little, and the frequency range of the servo loop needs not be so wide. And therefore, the driving means of the focusing lens may be, other than the conventional magnetic means, a piezo element or a magnetostrictive element.

Figure 5:
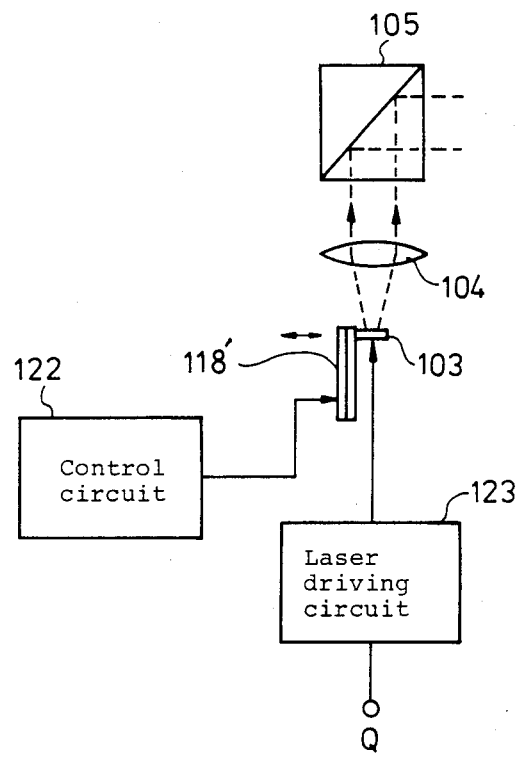
FIG. 5 and FIG. 6 are partial block diagrams showing other examples embodying the present invention.
Figure 6:
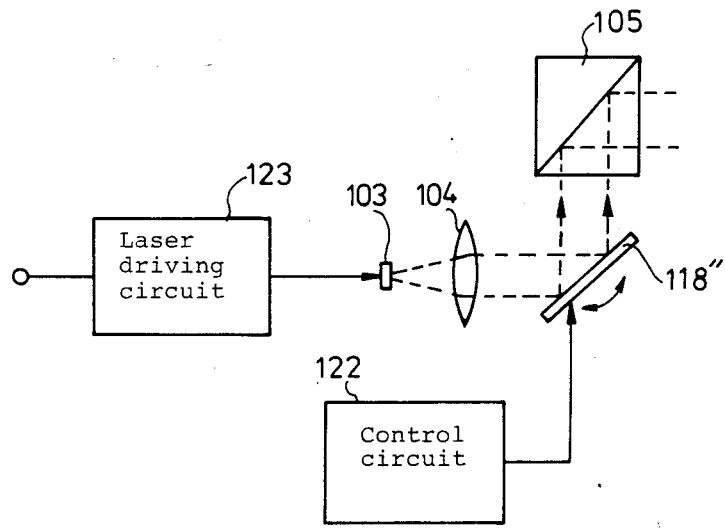

Other embodiments of driving means to move the light spot M only in substantially perpendicular direction to the information track 51 are shown in FIG. 5 and FIG. 6. As shown in FIG. 5, the semiconductor laser 103 is fixed to an end part of a driving means 118' which is made by a piezo element or magnetostrictive element. The light spot M is moved in a direction substantially perpendicular to the information track by moving the semiconductor laser 103.

In FIG. 6, an embodiment wherein a driving means uses a rotary mirror 118" which is driven by the magnetic means is shown. The light spot M is moved in a direction substantially perpendicular to the information track by the rotation of the mirror 118".

Instead of using the light beam pair comprising an oval preceding light spot M for erasing and a circular light spot L for recording and playing, the invention can be embodied using a pair of circular light spots wherein the preceding light spot records and the following light spot plays back (or reads) to confirm the recording.

What is claimed is:

1. An optical recording and playback apparatus having plural light spots comprising:
    a first detecting means for detecting a tracking error signal of a first light spot,
    a second detecting means for detecting a tracking error signal of a second light spot,
    a common focusing means for forming said first and second light spots on an information track of an optical recording medium,
    a first driving means for driving said first light spot and second light spot simultaneously in a substantially perpendicular direction to an appointed information track,
    a first tracking servo loop for controlling the first driving means based on the output of the first detecting means,
    a second driving means for driving said second light spot in a substantially perpendicular direction to a specified information track by moving an optical means,
    a second tracking servo loop for controlling the second driving means based on the output of the second detecting means.

2. An optical recording and playback apparatus having plural light spots in accordance with claim 1, wherein
a frequency response range of the first tracking servo loop is wider than a frequency response range of the second tracking servo loop.

3. An optical recording and playback apparatus having plural light spots in accordance with claim 1, wherein
a gain of the first tracking servo loop is higher than a gain of the second tracking servo loop.

4. An optical recording and playback apparatus having plural light spots in accordance with claim 1, wherein
said second driving means drives said optical means which act only on the second light beam and changes an incidence angle of the second light beam to the focusing means.

5. An optical recording and playback apparatus having plural light spots in accordance with claim 1, wherein
a wavelength of the first light beam is different from a wavelength of the second light beam.

6. An optical recording and playback apparatus having plural light spots in accordance with claim 1, wherein the second tracking servo loop includes means for driving said second light spot after the first tracking servo loop is put into operation.

7. An optical recording and playback apparatus having plural light spots in accordance with claim 1, wherein
an accuracy of a position of the second light spot to be controlled by the second driving means is less than a pitch of the information track and a driving range is less than two times said pitch of the information track.

8. An optical recording and playback apparatus having plural light spots in accordance with claim 1, wherein
the second driving means drives said optical means for the second light spot in substantially perpendicular direction to an optical axis of said second light spot and as a result moves the second light spot in substantially perpendicular direction to the information track of the optical disc.

9. An optical recording and playback apparatus having plural light spots in accordance with claim 1, wherein
the second driving means is a rotating mirror which is disposed in a light path of the second light spot.

10. An optical recording and playback apparatus having plural light spots in accordance with claim 1, wherein said first or second detection means comprises a device for detecting deviation between the position of the first or second light spot and the information track based on the reflected light beam of the first or second light spot from the optical recording medium.

11. Apparatus for ensuring proper tracking in an optical recording and playback system, comprising
first optical source means for providing a first optical beam having a first wavelength;
second optical source means for providing a second optical beam having a second wavelength;
a first beam splitter (105) for aligning said first and second beams along an optical axis;
mirror means for directing said first and second beams toward an optical recording medium information tracks;
focusing lens means for focusing both said first and second beams on said information track, light reflected from said information track guide passing back through said objective lens means in first and second reflected light beams, said reflected light beams being directed by said mirror means back along said optical axis;
means for driving said focusing lens means;
quarter wave plate means disposed along said optical axis, for transmitting said reflected beams;
polarizing beam splitter means disposed along said optical axis, for passing said second reflected beam, and for directing said first reflected beam toward a first tracking error detection means;
first tracking error detection means for receiving said first reflected beam, and for controlling said focusing lens means driving means to reduce tracking errors on said information track guide;
a second beam splitter (119) for directing said second reflected beam toward a second tracking error detection means; and
second tracking error detection means for receiving said second reflected beam, and for controlling said second optical source mans to reduce tracking errors on said information track guide.

12. Apparatus according to claim 11 wherein a frequency response range of said first tracking error detection means is wider than a frequency response range of the second tracking error detection means.

13. Apparatus according to claim 11 wherein a gain of said first tracking error detection means is higher than a gain of said second tracking error detection means.

14. Apparatus according to claim 11 wherein said means for driving said focusing lens means drives said focusing lens means in a direction substantially perpendicular to a longitudinal direction of said information track guide.

15. Apparatus according to claim 11 wherein said second optical source means provides a second optical beam which, when incident upon said information track guide, forms a beam spot having a cross-sectional oval shape in which a major axis is disposed substantially parallel to a longitudinal axis of said information track guide.

16. Apparatus according to claim 11 wherein said second tracking error detection means includes means for controlling said collimator lens means driving means so that said collimator lens means is driven after said focusing lens means is driven by said means for driving said focusing leans means.

17. Apparatus according to claim 11 wherein said second tracking error detection means includes:
a two-region photosensitive detector for receiving the second reflected beam;
a differential circuit coupled to said photosensitive detector; and
a control circuit coupled to said differential circuit and to said means for driving said collimator lens means.

18. Apparatus according to claim 11 wherein said first tracking error detection means includes:
a two-region photosensitive detector for receiving the first reflected beam;
a differential circuit coupled to said photosensitive detector; and a control circuit coupled to said differential circuit and controllng said means for driving said focusing said lens means.

19. Apparatus according to claim 11 wherein said second optical source means includes:
collimator lens means for collimating said second optical beam; and
means for driving said collimator lens means;
wherein said second tracking error detection means controls said collimator lens means driving means to reduce tracking errors on said information track.

20. Apparatus according to claim 11 wherein said second optical source means includes:
collimator lens means for collimating said second optical beam;
a light source for providing said second optical beam;
a laser driving circuit for driving said optical source;
driving means for driving said optical source in a direction substantially perpendicular to an optical axis of said second optical beam; and
a control circuit for controlling said driving means.

21. Apparatus according to claim 11 wherein said second optical source means includes:
an optical source for providing said second optical beam;
a laser driving circuit for driving said optical source;
a collimator lens for collimating said second optical beam;
a rotary mirror for directing said optical beam to said first beam splitter; and
a control ciruit for controlling said rotary mirror.

* * * * *